(12) United States Patent
Jaico et al.

(10) Patent No.: US 12,324,442 B2
(45) Date of Patent: Jun. 10, 2025

(54) CONFECTIONERY CHIP PRODUCT; AND METHODS OF MAKING THE SAME

(71) Applicant: Intercontinental Great Brands LLC, East Hanover, NJ (US)

(72) Inventors: Tracy Jaico, East Hanover, NJ (US); Kiran Vyakaranam, East Hanover, NJ (US); Anny M. Hierro, East Hanover, NJ (US); Priya Gokhale, East Hanover, NJ (US); Sharat Jonnalagadda, East Hanover, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 575 days.

(21) Appl. No.: 17/628,607

(22) PCT Filed: Aug. 10, 2020

(86) PCT No.: PCT/US2020/045583
§ 371 (c)(1),
(2) Date: Jan. 20, 2022

(87) PCT Pub. No.: WO2021/030247
PCT Pub. Date: Feb. 18, 2021

(65) Prior Publication Data
US 2022/0264905 A1 Aug. 25, 2022

Related U.S. Application Data

(60) Provisional application No. 62/886,619, filed on Aug. 14, 2019.

(51) Int. Cl.
*A23G 3/42* (2006.01)
*A23G 3/34* (2006.01)
*A23G 3/48* (2006.01)

(52) U.S. Cl.
CPC ............ *A23G 3/42* (2013.01); *A23G 3/0063* (2013.01); *A23G 3/48* (2013.01)

(58) Field of Classification Search
CPC .................................. A23G 3/42; A23G 3/48
See application file for complete search history.

(56) References Cited

U.S. PATENT DOCUMENTS

| | | |
|---|---|---|
| 3,492,131 A | 1/1970 | Schlatter |
| 4,032,661 A | 6/1977 | Rowsell et al. |
| 4,136,163 A | 1/1979 | Watson et al. |
| 4,178,459 A | 12/1979 | Watson et al. |
| 4,230,688 A | 10/1980 | Roswell et al. |
| 4,296,255 A | 10/1981 | Roswell et al. |
| 4,459,425 A | 7/1984 | Amano et al. |
| 4,491,597 A | 1/1985 | Varvil et al. |
| 4,619,834 A | 10/1986 | Zanno et al. |
| 4,879,122 A | 11/1989 | Seely, Jr. et al. |
| 5,009,893 A | 4/1991 | Cherukuri et al. |
| 5,266,592 A | 11/1993 | Grub et al. |
| 5,407,665 A | 4/1995 | McLaughlin et al. |
| 5,545,424 A | 8/1996 | Nakatsu et al. |
| 5,679,397 A | 10/1997 | Kuroda et al. |
| 5,698,181 A | 12/1997 | Luo |
| 6,159,509 A | 12/2000 | Johnson et al. |
| 6,207,207 B1 | 3/2001 | Belzowski |
| 6,277,385 B1 | 8/2001 | Luke |
| 6,592,884 B2 | 7/2003 | Hofmann et al. |
| 6,627,233 B1 | 9/2003 | Wolf et al. |
| 6,780,443 B1 | 8/2004 | Nakatsu et al. |
| 7,030,273 B1 | 4/2006 | Sun |
| 7,189,760 B2 | 3/2007 | Erman et al. |
| 2004/0047962 A1 | 3/2004 | Takaichi et al. |
| 2005/0003048 A1 | 1/2005 | Pearce et al. |
| 2005/0042344 A1 | 2/2005 | Chan |
| 2005/0222256 A1 | 10/2005 | Erman et al. |
| 2005/0265930 A1 | 12/2005 | Erman et al. |
| 2008/0187642 A1 | 8/2008 | Ekanayake et al. |
| 2009/0081349 A1 | 3/2009 | Kamper et al. |
| 2009/0208607 A1 | 8/2009 | Bunke et al. |
| 2009/0285940 A1 | 11/2009 | Foehse et al. |
| 2011/0111105 A1 | 5/2011 | Besse et al. |
| 2011/0305818 A1 | 12/2011 | Kurosaki et al. |
| 2013/0108743 A1 | 5/2013 | Campbell |
| 2013/0309369 A1 | 11/2013 | Hershberg |
| 2015/0223488 A1 | 8/2015 | Kabse et al. |
| 2015/0250190 A1 | 9/2015 | Vemulapalli et al. |

FOREIGN PATENT DOCUMENTS

| | | |
|---|---|---|
| AU | 2011218776 B2 | 3/2015 |
| CN | 1482863 A | 3/2004 |
| CN | 102355826 A | 2/2012 |
| CN | 102396635 A | 4/2012 |

(Continued)

OTHER PUBLICATIONS

Aprea, et al. "Sweet taste in apple: the role of sorbitol, individual sugars, organic acids and volatile compounds". Available Mar. 21, 2017 from www.nature.com/scientificreports. pp. 1-10. (Year: 2017).*
A. Salvador et al., "Understanding potato chips crispy texture by simultaneous fracture and acoustic measurements, and sensory analysis", LWT-Food Science and Technology, vol. 42, 2009, pp. 763-767.
Belgian Chocolate Thins, Snack review, https://www.taquitos.net/candy/Belgian-Chocolate-Thins-Caramel, Accessed Mar. 18, 2019.
International Search Report issued in Application No. PCT/US2020/045583 on Nov. 10, 2020, 10 pages.
Richard W. Hartel et al., "Phase/State Transitions of Confectionery Sweeteners: Thermodynamic and Kinetic Aspects", Comprehensive Reviews in Food Science and Food Safety, vol. 10, 2001.
Written Opinion issued in Application No. PCT/US2020/045583 on Nov. 10, 2020, 13 pages.

*Primary Examiner* — Jenna A Watts
(74) *Attorney, Agent, or Firm* — CANTOR COLBURN LLP

(57) ABSTRACT

Disclosed are confectionery products having a texture and other attributes of a potato chip or snack chip, but which is made from candy ingredients.

25 Claims, 2 Drawing Sheets

(56) References Cited

FOREIGN PATENT DOCUMENTS

| | | | |
|---|---|---|---|
| CN | 102919691 A | 2/2013 |
| CN | 104522551 A | 4/2015 |
| CN | 104768393 A | 7/2015 |
| EP | 2127528 A1 | 12/2009 |
| GB | 2520954 A | 6/2015 |
| JP | 2006204297 A | 8/2006 |
| JP | 2010516288 A | 5/2010 |
| JP | 2012191863 A | 10/2012 |
| WO | 9501735 A1 | 1/1995 |
| WO | 1995001735 A1 | 1/1995 |
| WO | 9835568 A2 | 8/1998 |
| WO | 1998035568 A2 | 8/1998 |
| WO | 0018365 A2 | 4/2000 |
| WO | 2000018365 A2 | 4/2000 |
| WO | 2004045306 A2 | 6/2004 |
| WO | 2006125334 A1 | 11/2006 |
| WO | 2007099506 A1 | 9/2007 |
| WO | 2008093301 A1 | 8/2008 |
| WO | 2010062866 A2 | 6/2010 |

\* cited by examiner

CONFECTIONERY CHIP PRODUCT; AND METHODS OF MAKING THE SAME

CROSS-REFERENCE TO RELATED APPLICATIONS

This application is a U.S. National Stage Application of PCT/US2020/045583, filed Aug. 10, 2020, which claims the benefit of priority of U.S. Provisional Patent Application No. 62/886,619, filed Aug. 14, 2019, the contents of which are incorporated herein by reference in their entirety for all purposes.

BACKGROUND

Snack foods, including potato chips, corn chips, popcorn, and candies are enjoyed between regular meals (breakfast, lunch, dinner) typically with a portion size smaller than regular meals. Potato chips, corn chips, and similar savory snack chips provide the consumer with desirable textural attributes of a crunchy, crispy bite and crunching sound when chewed. Candies include chocolate, caramels, hard boiled candy sweets, nougat, and gummy candies, to name a few. Many gelatin or starch based candies are chewy in texture, with a high moisture content (e.g., 8-15 percent by weight). Other gelatin or starch based candies are aerated or foamed, such as marshmallows. These confections do not provide the same texture or crunch as a potato chip or snack chip. Potato chips and snack chips, however, are high in fat and calories, and often high in salt.

There remains a need in the art for new confectionery products that have unique organoleptic properties to provide an enhanced eating experience to a consumer, while at the same time limiting the amount of fat and salt that is consumed.

SUMMARY

In one embodiment, a confectionery chip product, comprises a bulk sweetener and a gelatinized starch. The confectionery chip product comprises one or more of the following attributes: a moisture content of about 0 to less than 6 wt %, about 0.25 to about 5wt %, about 0.5 to about 4 wt %, about 0.75 to about 3 wt %, or about 1 to about 2 wt % based on the total weight of the confectionery chip product; a thickness of less than 4 mm; a non-uniform cell structure; and a breaking force of less than 2000 g, about 150 to about 1500 g, about 200 to about 1000 g, 300 to about 800 g, or about 400 to about 600 g as measured by a texture analyzer having a spherical probe (TA-8, ¼" (6.35 mm)diameter ball), and with 50 kg load cell.

In another embodiment, a method of making a confectionery chip product comprises preparing a confectionery chip dough composition that is capable of being formed into a sheet, the confectionery chip dough composition comprising a bulk sweetener, a gelatinized starch, and moisture; forming pieces from the sheet; and removing moisture from the pieces to form the confectionery chip product, e.g., baking, microwaving, drying under vacuum, etc. the pieces to form the confectionery chip product.

A package, comprising a confectionery chip product.

The above described and other features are exemplified by the following detailed description.

DETAILED DESCRIPTION

Figure 1:
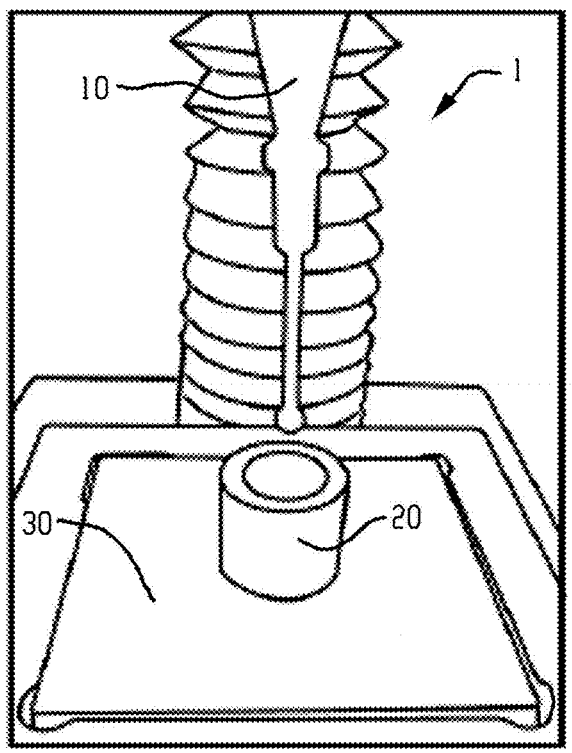
FIG. 1 is a schematic of a texture analyzer set-up with a Crisp Fracture Support Rig and corresponding platform from Stable Micro Systems.

Disclosed herein is a new type of confectionery product in the form of a thin crunchy or crispy candy chip-like consumable prepared from a bulk sweetener and a "crisping agent", e.g., a gelatinized starch. The thin, crisp and light candy eats like a snackable and munchable treat. As used herein, the term "confectionery chip" and "candy chip" are used interchangeably.

The confectionery chip is reminiscent of a potato chip, corn chip, or other snack chip in texture attributes and can be similar in overall shape, thickness, size, surface area, weight, and the like. The shared texture attributes include a snap or crunch sound and feeling when chewed. A further advantage of the confectionery chip product is that it has been surprisingly found that even though it has a high surface area compared to conventional hard candy products, the confectionery chip product dissolves slowly in water, with a low dissolution. The slow dissolution of the confectionery chip product provides the consumer with a longer lasting taste experience compared to conventional hard candy as it will remain in the mouth longer. In an embodiment, the confectionery chip product has a slower dissolution in water than a hard boiled candy product.

The confectionery chip product comprises a bulk sweetener, a gelatinized starch, and has a low moisture content. The confectionery chip product may optionally further comprise any number of additional ingredients in any suitable amount as long as the potato chip-like texture and crunch is not substantially diminished. Exemplary additional confectionery chip ingredients include a non-starch hydrocolloid, a colorant, a dried fruit or vegetable, a fat or oil, a flavorant, a flavor modulator or potentiator, a food acid or a salt thereof, a functional ingredient, a high-intensity sweetener, glycerin, propylene glycol, a crystallization inhibitor, a nut or nut pieces, a salt, a sensate, or a combination thereof. The confectionery chip product may optionally further comprise a coating ingredient as described herein.

The confectionery chip product may be prepared from a confectionery chip dough composition that is exposed to conditions sufficient to reduce the water/moisture content of the confectionery chip dough composition to achieve the confectionery chip product. Exemplary conditions include drying (optionally under vacuum), baking, microwaving, etc. or a combination thereof. The confectionery chip dough composition comprises a bulk sweetener; a gelatinized starch; and water. The water may be provided in the form of a juice. The confectionery chip dough composition may optionally further comprise any number of additional ingredients as found in the confectionery chip product. Exemplary additional confectionery chip dough composition ingredients include a non-starch hydrocolloid, a colorant, a dried fruit or vegetable, a fat or oil, a flavorant, a flavor modulator or potentiator, a food acid or a salt thereof, a functional ingredient, a high-intensity sweetener, dough conditioner, a crystallization inhibitor, a nut or nut pieces, a salt, a sensate, or a combination thereof.

The gelatinized starch used in the confectionery chip can be derived from a native starch, a pre-gelatinized starch, a partially pre-gelatinized starch, or a combination thereof, specifically a pregelatinized starch. Exemplary starches include a plant root starch, for example potato, tapioca, arrowroot, and the like, or a combination thereof; a plant grain starch, for example, corn, wheat, oat, barley, bulgur, millet, rice, and the like, or a combination thereof, and the like, each of which can be pregelatinized. Any single plant root starch and plant grain starch can be used, as well as any combination of plant root starch or plant grain starch can be used. In an embodiment, the starch is corn starch. In another embodiment, the starch is a pre-gelatinized starch. Pre-gelatinized starch is starch that has been precooked in water and then dried. When a native starch is used to prepare the confectionery chip dough composition, the native starch is hydrated prior to use.

When used to prepare the confectionery chip dough composition, the starch is gelatinized in water or otherwise hydrated prior to mixing with the other dough ingredients.

The starch can be used in an amount of about 5 to about 50 weight percent (wt %) based on the total weight of the confectionery chip dough composition, specifically about 10 to about 45 wt %, more specifically about 15 to about 40 wt %, yet more specifically about 20 to about 35 wt %, and still yet more specifically about 25 to about 30 wt %.

The bulk sweetener that can be used to prepare the confectionery chip dough composition and thus the confectionery chip product can include saccharides such as mono-saccharides, di-saccharides and poly-saccharides, for example, sucrose (sugar), dextrose/glucose, maltose, dextrin, xylose, ribose, mannose, galactose, fructose (levulose), lactose, invert sugar, fructo oligo saccharide syrups, partially hydrolyzed starch, corn syrup solids, such as high fructose corn syrup, glucose syrup, or a combination thereof. Further exemplary sugarless bulk sweetener can be a sugar alcohol or sugar alcohol syrups such as erythritol, galactitol, isomalt (hydrogenated isomaltulose), a hydrogenated starch hydrolysate, lactitol, maltitol, maltitol syrup, mannitol, polyglycitol, sorbitol, sorbitol syrups, xylitol, or a combination thereof. As used herein, the term "sugar alcohol" is interchangeable with "sugar polyol".

In an embodiment, the bulk sweetener is sucrose (sugar) or sucrose and glucose syrup.

The bulk sweetener can be used in an amount of about 10 to about 65 wt % based on the total weight of the confectionery chip dough composition, specifically about 20 to about 55 wt %, more specifically about 30 to about 45 wt %, and yet more specifically about 35 to about 40 wt %.

The weight ratio of bulk sweetener to starch in either the confectionery chip product or the confectionery chip dough composition can be about 8: 1, about 6: 1, about 5: 1, about 4: 1, about 3: 1, about 2:1, about 1: 1, and about 0.5: 1.

Water or a source of water such as a juice is used in the preparation of the confectionery chip dough composition. The juice can be derived from a fruit or vegetable source. Suitable juice includes fruit juice, vegetable juice, fruit juice concentrate, vegetable juice concentrate, clarified fruit juice, clarified vegetable juice, or a combination thereof.

The confectionery chip dough composition can have a moisture content of about 10 to about 75 w t% based on the total weight of the confectionery chip dough composition, specifically about 15 to about 60 wt %, more specifically about 20 to about 45 wt %, and yet more specifically about 25 to about 30 wt %.

The finished confectionery chip can have a moisture content of about 0 to less than 6 wt % based on the total weight of the finished confectionery chip product, specifically about 0.25 to about 5 wt %, more specifically about 0.5 to about 4 wt %, yet more specifically about 0.75 to about 3 wt %, and still yet more specifically about 1 to about 2 wt %.

The confectionery chip dough composition and confectionery chip product can optionally further comprise a flavorant (also referred to herein as flavor or flavoring agent). The overall flavor profile of the confectionery chip product may be a sweet flavor, a fruit flavor, a savory flavor, a chocolate or cocoa flavor, a dairy flavor (milk, butter, cheese, cream, yogurt), a vanilla flavor, a tea or coffee flavor (green tea, oolong tea), a mint flavor (peppermint, spearmint), a spice flavor (anise, angelica, fennel, allspice, cinnamon, chamomile, mustard, cardamom, caraway, cumin, clove, pepper, coriander, sassafras, juniper berry, ginger, star anise, horseradish, capsicum, nutmeg, wasabi), an herb flavor (thyme, tarragon, dill, nutmeg, basil, marjoram, rosemary, bay leaf), a floral or vegetable flavor (onion, garlic, cabbage, carrot, celery, mushroom, tomato), or a combination thereof.

Flavorants that can be used include those artificial or natural flavors known in the art, for example synthetic flavor oils, natural flavoring aromatics and/or oils, oleoresins, extracts derived from plants, leaves, flowers, fruits, and the like, or a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, or a combination thereof. Specific flavorants are mints such as peppermint, spearmint, artificial vanilla, cinnamon derivatives, and various fruit flavors.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavorant can be used in liquid or solid form. When used in solid (dry) form, suitable drying means such as spray drying the oil can be used. Alternatively, the flavorant can be encapsulated, absorbed onto water soluble materials by means known in the art, for example onto cellulose, starch, sugar, maltodextrin, gum arabic, and the like. In some embodiments, each individual or combination of flavorant is encapsulated or unencapsulated (or "free").

The flavorant can be used in an amount sufficient to provide a desirable flavor profile to the confectionery chip product. Exemplary amounts of flavorant that can be used include about 0.1 to about 5.0 wt % based on the total weight of the confectionery chip dough composition, specifically about 0.5 to about 4.0 wt %, more specifically about 1.0 to about 3.0 wt %, and yet more specifically about 1.5 to about 2.0 wt %.

The confectionery chip dough composition and confectionery chip product can optionally further comprise a non-starch hydrocolloid, which can be a naturally occurring material such as plant exudates, seed gums, and seaweed extracts or they may be chemically modified materials such as a modified cellulose or a natural gum derivative. Suitable non-starch hydrocolloids include acacia gum/gum arabic, agar agar, an alginate, bacterial gums (e.g. gellan gum), beta glucan, a carrageenan, chitosan, curdlan, furcellaran, a galactomannan (e.g., Guar gum, Locust bean gum, tara gum), gelatin, gellan gum, glucomannan (e.g., Konjac), gum ghatti, karaya gum, konjacxyloglucan, locust bean gum, a modified cellulose (e.g., carboxymethlcellulose (CMC), ethylcellulose (MC), hydroxypropylcellulose (HPC), hydroxypropyl methylcellulose (HPMC), microcrystalline cellulose, methylcellulose), a modified natural gum (e.g., a propylene glycol alginate, carboxymethyl locust bean gum, low methoxyl pectin), pectin, tamarin, tragacanth gum, xanthan gum, or a combination thereof.

The hydrocolloid can be used in an amount of about 0.01 to about 5 wt % based on the total weight of the confectionery chip dough composition specifically about 0.05 to about 4 wt %, more specifically about 0.1 to about 3 wt %, yet more specifically about 0.5 to about 2 wt %, and still yet more specifically about 0.75 to about 1 wt %.

The confectionery chip dough composition and confectionery chip product can optionally further comprise a colorant. Coloring agents (colors, colorants, colorings) can be used in amounts effective to produce a desired color for the confectionery chip product.

Suitable coloring agents include pigments, which can be incorporated in amounts up to about 6 wt % based on the total weight of the dough composition. For example, titanium dioxide can be incorporated in amounts up to about 2 wt %, and specifically less than about 1 wt %. Suitable coloring agents also include natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination thereof. In some embodiments, certified colors can include FD&C aluminum lakes, or a combination thereof. A full recitation of all FD& C colorants and their corresponding chemical structures may be found in the Kirk-Othmer Encyclopedia of Chemical Technology, 4th Edition, in volume 1 at pages 492-494, which text is incorporated herein by reference.

The colorant may optionally be in the form of a particulate or flake such as an edible glitter.

A dough conditioner may be used in the confectionery chip dough composition and the confectionery chip product to aid is processing. Exemplary dough conditioners include glycerin, propylene glycol, or combination thereof. Glycerin may also be added to for flavoring enhancement.

When used, the glycerin can be used in an amount of about 0.01 to about 2 wt % based on the total weight of the confectionery chip dough composition, specifically about 0.05 to about 1.5 wt %, more specifically about 0.1 to about 1.0 wt %, and yet more specifically about 0.3 to about 0.7 wt %.

The food acid or salt thereof that can be used in the confectionery chip product and dough composition includes acetic acid, adipic acid, ascorbic acid, butyric acid, citric acid, formic acid, fumaric acid, glyconic acid, lactic acid, phosphoric acid, malic acid, oxalic acid, succinic acid, tartaric acid, or a combination thereof, and alkali metal salts thereof (e.g., sodium citrate). The food acid or salt thereof may be encapsulated or unencapsulated (or "free"). If more than one food acid or salt thereof is used, any combination of encapsulated or unencapsulated ingredients may be used.

The food acid or salt thereof can be present in the confectionery chip product or dough composition in an amount of about 0.01 to about 2.0 wt % based on the total weight of the confectionery chip dough composition, specifically about 0.1 to about 1.5 wt %, and more specifically about 0.3 to about 1.0 wt %.

In an embodiment, the food acid or salt thereof is used as a coating ingredient. In a further embodiment an acid blend including two or more acids such as an acid blend of citric acid, lactic acid, tartaric acid, or fumaric acid is used. In an embodiment, the food acid or salt thereof used as a coating ingredient is in particulate form.

The confectionery chip dough composition and confectionery chip product can optionally further comprise a high intensity sweetener. A "high intensity sweetener" as used herein means agents having a sweetness greater than the sweetness of sucrose. In some embodiments, a high intensity sweetener has a sweetness that is at least 100 times that of sugar (sucrose) on a per weight basis, specifically at least 500 times that of sugar on a per weight basis. In one embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, protein based sweeteners, or a combination thereof. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, or a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenyl-alanine; L-aspartyl-L-(1-cyclohexen)-alanine, neotame, or a combination thereof;

water-soluble sweeteners derived from naturally occurring water-soluble sweeteners, such as steviosides and stevia derived compounds such as but not limited to steviol glycosides such as rebaudiocides including rebaudiocide A, and the like, lo han quo and lo han quo derived compounds such as iso-mogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideox y-beta-D-fructofuranoside, or 4,6,1',6'-tetrachloro4,6,1',6'-tetradeoxygalacto-sucrose; 4,6,1',6'-tetradeoxy-sucrose, or a combination thereof;

protein based sweeteners such as thaumaoccous danielli, talin, or a combination thereof; and amino acid based sweeteners.

The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, or a combination thereof.

Specific high intensity sweeteners for use in the confectionery chip product and dough composition include aspartame, neotame, sucralose, monatin, acesulfame potassium, an encapsulated form of the foregoing high intensity sweetener, or a combination thereof.

The amount of high intensity sweetener used can be about 0.01 to about 6 wt % based on the total weight of the confectionery chip dough composition, specifically about 1 to about 3 wt %.

The confectionery chip dough composition and confectionery chip product can optionally further comprise a sensate. Sensates can include cooling agents, warming agents, tingling agents, or a combination thereof.

Cooling agents are additives that provide a cooling or refreshing effect in the mouth, in the nasal cavity, or on skin. For example, among the useful cooling agents are included menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-2,2-diisopropylbutanamide, N-ethyl-p-menthane-3-carboxamide (WS-3), ethyl ester of N-[[5-methyl-2-(1-methylethyl)cyclohexyl]carbonyl]glycine (WS-5), as well as the substantially pure ethyl ester of N-[[5-methyl-2-(1-methylethyl)cyclohexylcarbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-l-ol, 3-(1-menthoxy)propan-1-ol, 341-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo(2.2.1), Heptane-2-carboxamide; Menthol methyl ether, menthyl pyrrolidone carboxylate; 2,5-dimethyl-4-(1-pyrrolidinyl)-3 (2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

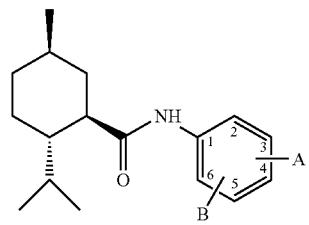

wherein B is selected from H, $CH_3$, $C_2H_5$, $OCH_3$, $OC_2H_5$, and OH; and wherein A is a moiety of the formula-CO-D, wherein D is selected from the following moieties: (i)-

NR$^1$R$^2$, wherein R$^1$ and R$^2$ are independently selected from H and C$_1$-C$_8$ straight or branched-chain aliphatic, alkoxyalkyl, hydroxyalkyl, araliphatic and cycloalkyl groups, or R$^1$ and R$^2$ together with the nitrogen atom to which they are attached form part of an optionally-substituted, five-or six-membered heterocyclic ring; (ii)—NHCH$_2$COOCH$_2$CH$_3$, —NHCH$_2$CONH$_2$, —NHCH$_2$CH$_2$OCH$_3$, —NHCH$_2$CH$_2$OH, —NHCH$_2$CH(OH)CH$_2$OH and (iii) a moiety selected from the group consisting of:

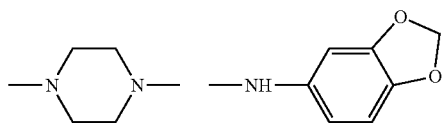

as disclosed in PCT Patent Application WO2006/125334 to Bell et al. which is incorporated in its entirety herein by reference, among others. Other compounds include the alpha-keto enamines disclosed in U.S. Pat. No. 6,592,884 to Hofmann et al. which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. Published Patent Applications, all of which are incorporated in their entirety by reference hereto: U.S. 2005/0222256; 2005/0265930.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, or a combination thereof.

Tingling agents may be employed to provide a tingling, stinging or numbing sensation to the user. Tingling agents include, but are not limited to: Jambu Oleoresin or para cress (Spilanthes sp.), in which the active ingredient is Spilanthol; Japanese pepper extract (Zanthoxylum peperitum), including the ingredients known as Saanshool-I, Saanshool-II and Sanshoamide; perillartine; 4-(1-menthoxymethyl)-2-phenyl-1,3-dioxolane; black pepper extract (piper nigrum), including the active ingredients chavicine and piperine; Echinacea extract; Northern Prickly Ash extract; trans-pellitorin, and red pepper oleoresin. In some embodiments, alkylamides extracted from materials such as jambu or sanshool may be included. Examples of "tingling" type sensates include those disclosed in U.S. Pat. Nos. 6,780,443, 6,159,509, 5,545,424, and 5,407,665, each of which is incorporated by reference herein in its entirety.

The amount of sensate present in the confectionery chip product or dough composition can be 0.001 to about 5.0 wt % based on the total weight of the confectionery chip dough composition, specifically about 0.01 to about 3.0 wt %, and more specifically about 0.1 to about 1 wt %.

The confectionery chip dough composition and confectionery chip product can optionally further comprise a flavor modulator or potentiator. A sweet taste can be imparted by flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In some embodiments, flavor modulators or potentiators are designed to intensify, supplement, modify, or enhance the perception of flavor, sweetness, tartness, umami, kokumi, saltiness or a combination thereof can be included. Thus, the addition of flavor modulators or potentiators can impact the overall taste of the product. For example, flavors can be compounded to have additional sweet notes by the inclusion of flavor modulators or potentiators, such as vanilla, vanillin, ethyl maltol, furfual, ethyl propionate, lactones, or a combination thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), or a combination thereof. In some embodiments, sugar acids, sodium chloride, potassium chloride, sodium acid sulfate, or a combination thereof are used. In other embodiments, glutamates such as monosodium glutamate, monopotassium glutamate, hydrolyzed vegetable protein, hydrolyzed animal protein, yeast extract, or a combination thereof are included. Further examples include adenosine monophosphate (AMP), glutathione, and nucleotides such as inosine monophosphate, disodium inosinate, xanthosine monophosphate, guanylate monophosphate, or a combination thereof. Further examples of flavor potentiator compositions that impart kokumi are also included in U.S. Pat. No. 5,679,397 to Kuroda et al.

When used, the amount of flavor modulators or flavor potentiators can be a matter of preference subject to such factors as the type of final product composition, the individual flavor, the strength of flavor desired, and the location of the ingredient (coating, dough). Thus, the amount of flavor modulators or flavor potentiators can be varied in order to obtain the result desired in the final product and such variations are within the capabilities of those skilled in the art without the need for undue experimentation.

The confectionery chip product or dough composition can optionally further include a functional ingredient such as a breath freshener, a dental care component, a pharmaceutically active agent, a vitamin, a micronutrient, a mouth moistening component, a throat care component, an energy boosting agent, a concentration boosting agent, or a combination thereof.

The confectionery chip dough composition and confectionery chip product can optionally further comprise an oil or fat. Exemplary oil and fats include partially or fully hydrogenated vegetable oil, partially or fully hydrogenated animal fat, a glyceride, or a combination thereof. In some embodiments, the partially or fully hydrogenated oil or fat is canola oil, coconut oil, corn oil, palm kernel oil, peanut oil, soy bean oil, sesame oil, cottonseed oil, cocoa butter, milk fat, beef tallow, and lard. Glycerides include medium chain triglycerides.

In some embodiments, the confectionery chip product or dough composition further comprises an emulsifier. In some embodiments, the emulsifier is glyceryl monostearate, lecithin, a fatty acid monoglyceride, a diglyceride, propylene glycol monostearate, or a combination thereof.

The confectionery chip dough composition and confectionery chip product can optionally further comprise a dried fruit or vegetable. The dried fruit for vegetable can be in the form of a powder, small particulates, or larger sized pieces. A fruit or vegetable juice powder, including freeze-dried or spray-dried fruit or vegetable juice powder may be used.

The confectionery chip can have any shape or dimension that provides a crunchy or crispy texture when consumed. The confectionery chip is predominantly a two-dimensional object. The general two-dimensional shape of the confectionery chip can be in the shape of a circle, oval, square, rectangle, triangle, trapezoid, hexagon, octagon, star, crescent, and the like; alternatively it can be in the shape of a silhouette of a cartoon character, person, and the like; or any cookie cutter shape.

Exemplary thickness of the confectionery chip product can be less than 4 millimeters (mm), specifically about 0.5 to about 3.0 mm, more specifically about 0.75 to about 2.75 mm, yet more specifically about 1.0 to about 2.5 mm, still more specifically about 1.25 to about 2.25 mm, and more specifically 1.5 to about 2.0 mm.

Exemplary longest dimension of the confectionery chip product can be about 1 to about 8 centimeters (cm), more specifically about 2 to about 7 cm, yet more specifically about 3 to about 6 cm, still more specifically about 4 to about 5 cm, and more specifically about 4 cm.

Exemplary surface area of the confectionery chip product can be about 1 to about 65 cm$^2$, more specifically about 5 to about 50 cm$^2$, yet more specifically about 15 to about 35 cm$^2$, and still more specifically about 20 to about 30 cm$^2$.

The confectionery chip product can be about 0.35 to about 2.5 grams (g) per chip, specifically about 0.5 to about 2.25 g, more specifically about 0.75 to about 2.0 g, yet more specifically about 1.0 to about 1.75 g, and still yet more specifically about 1.25 to about 1.5 g. The confectionery chip product can have one or more of the following attributes: a thickness of less than 4 mm, about 0.2 to about 3.0 mm, about 0.5 to about 2.75 mm, about 0.75 to about 2.5 mm, about 1.0 to about 2.25 mm, or 1.25 to about 2.0 mm; a longest dimension of about 1 to about 8 cm, about 2 to about 7 cm, about 3 to about 6 cm, or about 4 to about 5 cm; and a surface area of about 1 to about 65 cm$^2$, about 5 to about 50 cm$^2$, about 15 to about 35 cm$^2$, or about 20 to about 30 cm$^2$.

The confectionery chip may further comprise an additional ingredient on one or two surfaces of the product, herein referred to as "coating ingredients". The confectionery chip may comprise different coating ingredients for each surface, or it may comprise the same coating ingredients on both surfaces. The coating ingredient may be any one of a bulk sweetener, a colorant, a dried fruit or vegetable, a fat or oil, a flavorant, a flavor modulator or potentiator, a food acid or a salt thereof, a functional ingredient, a high-intensity sweetener, a nut or nut pieces, a salt, a sensate, or a combination thereof, as described herein for use in the confectionery chip dough composition or confectionery chip product. When multiple coating ingredients are employed, one may function to adhere other surface ingredients to the confectionery chip. For example, a fat or vegetable oil can be used to adhere another coating ingredient to a surface of the confectionery chip.

The coating ingredient may be in particulate form of any desired size distribution. In an embodiment, the bulk sweetener used as a coating ingredient can be a crystalline saccharide, a crystalline sugar alcohol, or a combination thereof. Likewise, the coating ingredients such as the food acid or salt thereof, flavorant, colorant, and the like can be in particulate form.

Coating flavor can be any suitable flavor including those as previously described for use to prepare the confectionery chip dough composition.

Texture Analysis: In further embodiments, the confectionery chip product exhibits a breaking force of less than 2000 g, specifically about 150 g to about 1500 g, more specifically about 200 g to about 1000 g, yet more specifically about 300 g to about 800 g, and still yet more specifically about 400 g to about 600 g as measured by a TA. ST. plus Texture analyzer, Stable Micro Systems, Scarsdale New York texture analyzer, using a spherical probe (TA-8, ¼" (6.35 mm)diameter ball), and with 50 kg load cell. The samples were placed on the HDP/CFS (Crisp Fracture Support Rig and corresponding platform, SMS). The test settings were: pretest speed 5.0 mm/sec., test speed 1 mm/sec., post-test speed 10 mm/sec., trigger force 5 g, and with a probe travel distance of the 3 mm. The breaking force is the first puncture into the chip.

Figure 2:
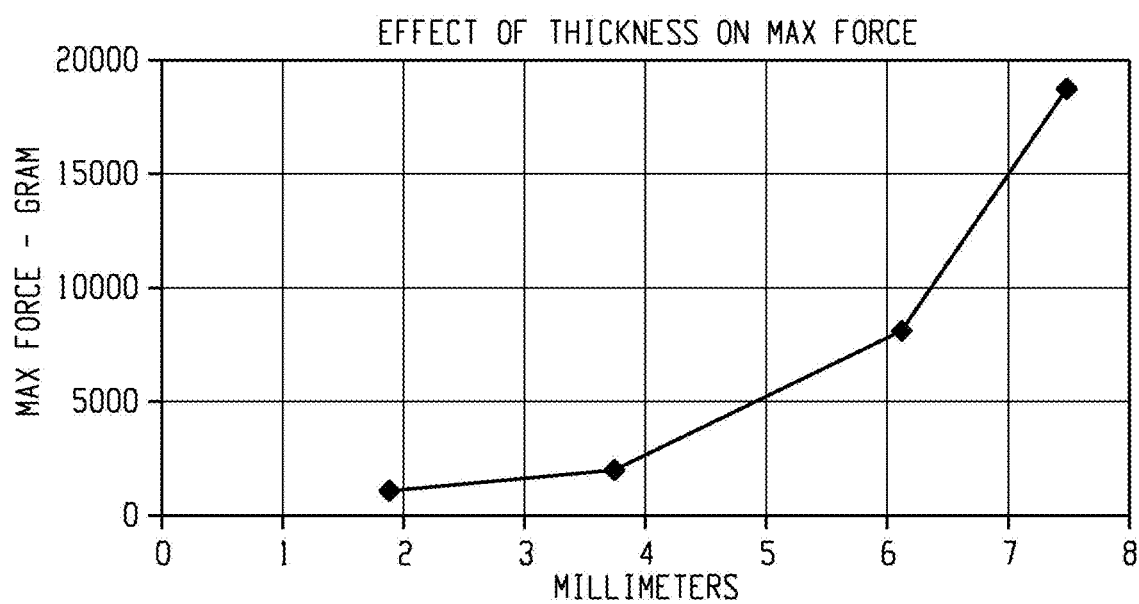
FIG. 2 is a graph of the effect of confectionery chip thickness on maximum force as measured in a texture analyzer test.

FIG. 2 is a graph of the effect of confectionery chip thickness on maximum force as measured in a texture analyzer test. Four chip thicknesses were examined 1.87 mm, 3.74 mm, 6.13 mm and 7.49 mm, which exhibited a maximum force of 971 g, 1960 g, 8115 g, and 18376 g, respectively. As shown, a thickness above 4 mm resulted in samples no longer having a crunchy or crispy texture, but rather a hard texture.

The confectionery chip product can be prepared for example, by baking the confectionery chip dough composition for a time and temperature suitable for reducing the moisture content to less than 6 wt %, specifically to about 1 to about 2 wt % based on the total weight of the chip product to result in a crunchy chip-like product. In another embodiment, the confectionery chip dough composition can be dried for a time and temperature suitable for reducing the moisture content to less than 6 wt %, specifically to about 1 to about 2 wt % based on the total weight of the chip product to result in a crunchy chip-like product, optionally dried under vacuum. In an exemplary process to prepare the confectionery chip dough composition, a bulk sweetener, water or juice, and an optional additional ingredient (e.g., a non-starch hydrocolloid, flavorant, colorant, high intensity sweetener, dough conditioner, crystallization inhibitor, etc., or a combination thereof) are combined and mixed, optionally under high shear to form a first mixture. The temperature at which the confectionery chip dough composition is prepared can be room temperature to about 90° C., specifically about 25 to about 80° C., more specifically about 30 to about 70° C., yet more specifically about 35 to about 65° C., and still yet more specifically about 40 to about 60° C. A hydrated starch is combined with the first mixture to form a second mixture. To hydrate the starch, the starch may be combined with water or juice to form a slurry and the starch slurry is combined with the first mixture to form the second mixture. In an embodiment, the second mixture can be the confectionery chip dough composition. In another embodiment, optional additional ingredients may be combined with the second mixture to form the confectionery chip dough composition.

The confectionery chip dough composition can be prepared using a batch method, a continuous method, or a combination thereof.

Once formed, the confectionery chip dough composition is then sheeted and cut into pieces. The thickness of the dough composition sheet can be less than 4 mm. The pieces can then baked at a temperature of about 120 to about 180° C., about 140 to about 170° C., or about 150 to about 160° C. for time sufficient to reduce the moisture content to less than 6 wt % based on the total weight of the confectionery chip product. Suitable timeframe for baking can be about 5 to about 45 minutes, about 15 to about 40 minutes, or about 25 to about 30 minutes. After baking, the confectionery chip is allowed to cool to harden.

In an embodiment, the confectionery chip dough composition, once prepared, is sheeted within a timeframe of about 5 to about 75 minutes, specifically from about 10 to about 60 minutes, more specifically about 20 to about 50 minutes, and yet more specifically about 30 to about 40 minutes from completion of the dough preparation. It is desirable to form a sheet of the confectionery chip dough composition at a time when there is appropriate starch hydration, specifically before the texture of the dough becomes too gummy or unable to be processed into sheets.

Sheeting, cutting, and baking equipment known in the confectionery arts may be used to manipulate the dough composition and prepare the confectionery chip product.

In an embodiment, the confectionery chip dough compositions comprises rework.

In an embodiment, the formed confectionery dough pieces may optionally be dried prior to being baked.

In an embodiment, the process to make the confectionery chip comprises sheeting a confectionery chip dough composition to form a dough sheet, molding or cutting pieces from the dough sheet, and baking the pieces.

In another embodiment, the process to make the confectionery chip comprises depositing thin strips of a confectionery chip dough composition to form a dough sheet, optionally molding or cutting pieces from the dough sheet, and baking the pieces.

The molding or cutting process can include the use of cutters in the general shape of the confectionery chip product or the use of a rotary mold.

In another embodiment, the process to make the confectionery chip comprises a stenciling process to form pieces that are then baked.

The confectionery chip products can optionally be coated with a coating ingredient. In an exemplary coating process, at least a portion of a surface of a confectionery chip is coated with a coating ingredient.

A method of coating a confectionery chip product comprises applying a coating ingredient to a surface of a confectionery chip product to form coated a confectionery chip product. Within this embodiment, the surface of the confectionery chip product is first coated with an adhering agent and then a second coating ingredient is applied. The adhering agent can be an oil or a non-aqueous binder solution. In an embodiment, vegetable oil is used as the adhering agent.

The adhering agent can be applied to the surface using a process such as spraying, dipping, painting, rolling, or other suitable means.

The coating process can involve a single application of a coating ingredient, or two or more applications of the same or different coating ingredient, optionally with one or more applications of an adhering agent as previously discussed.

In an embodiment, a plurality of confectionery chips in a package comprise confectionery chips of random size, shape, weight, and the like. In an embodiment, a plurality of confectionery chips in a package comprise confectionery chips of essentially uniform size, shape, weight, and the like capable of being stacked and packaged in a canister or tubular container. Once the product has been formed, it can optionally be packaged using processes and packaging known in the art.

The confectionery chip product can have a density of about 0.4 to about 1.5 g/cc, specifically about 0.5 to about 1.3 g/cc, more specifically about 0.6 to about 1.1 g/cc, yet more specifically about 0.7 to about 1.0 g/cc, and still yet more specifically about 0.8 to about 0.9 g/cc.

In an embodiment, the confectionery chip product comprises bulk sweetener predominantly in amorphous form, with low amounts of crystalline bulk sweetener. The amount of crystalline bulk sweetener in the confectionery chip product at the time of packaging is less than 30%.

Figure 3:
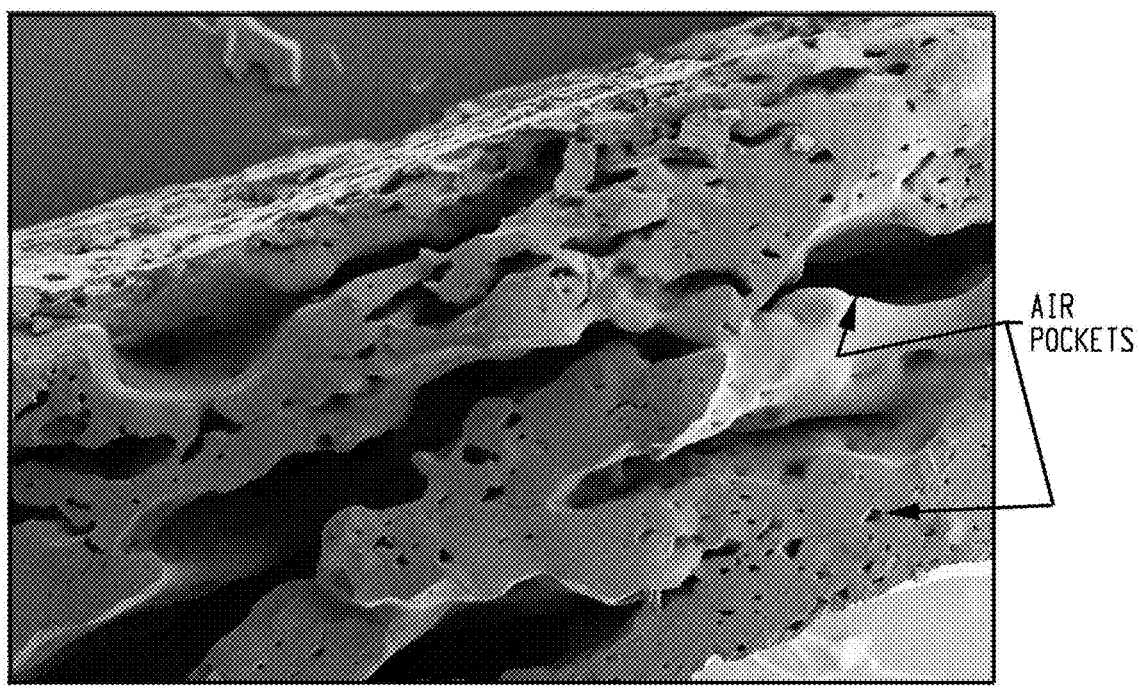
FIG. 3 is a Scanning Electron Microscopy image of a cross-section of a confectionery chip product.
Figure 4:
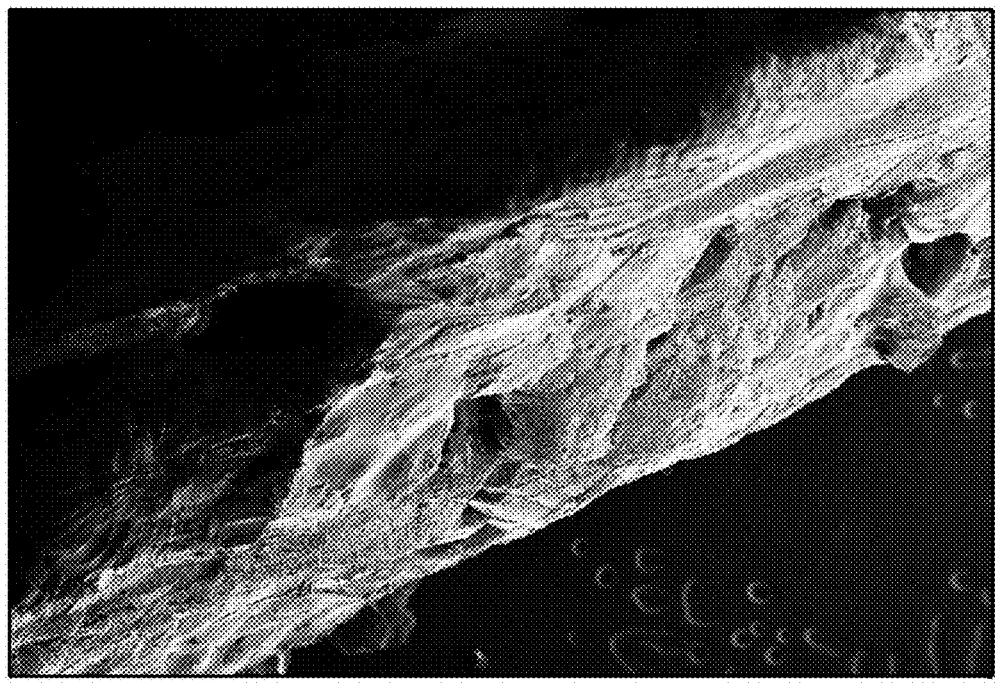
FIG. 4 is a Scanning Electron Microscopy image of a cross-section of a comparative confectionery product that does not contain a starch ingredient.

The confectionery chip as described herein is not a chewing gum, and is thus free of chewing gum base, free of chewing gum elastomer, and free of chewing gum resin. The confectionery chip as described herein is not a traditional baked good. In an embodiment, the confectionery chip is free of one or more of wheat flour, eggs, rising agents, and leavening agents. The confectionery chip as described herein is not purposely or intentionally aerated or foamed, that is, the confectionery is not subject to aeration accomplished by injecting a gas into the composition or by the use of ingredients that react to form a gas or by mechanical whipping to introduce air bubbles in the confectionery matrix. The confectionery therefore does not comprise a uniform cell structure such that the air bubbles (air cells) that are present are not uniform in size or uniform in distribution within the matrix of the confectionery chip. FIG. 3 is a Scanning Electron Microscopy image of a cross-section of a confectionery chip product. As shown, the confectionery chip product has a non-uniform distribution of cells within the confectionery matrix. It further has a non-uniform cell structure as the cell sizes vary considerably. Not wishing to be bound by theory, but the unique cell structure of the confectionery chip product may contribute to the crispy, crunchy, potato-chip-like texture. FIG. 4 is a Scanning Electron Microscopy image of a cross-section of a comparative confectionery that contains the same ingredients as the confectionery chip product of FIG. 3, except it was prepared without a starch ingredient. This image of the comparative sample shows the absence of a cell structure. This comparative sample did not have the textural attributes of a potato chip. In an embodiment, the confectionery chip product has a cell structure where the cells are non-uniform is size, specifically having a size ratio of at least 10: 1, more specifically at least 50: 1, and yet more specifically at least 100: 1. The size ratio can be based on a longest dimension of a cell or an area of a cell. Further within this embodiment, the confectionery chip product comprises a cell structure having a cell where the longest dimension is at least ½ the thickness of the confectionery chip product.

The features and advantages are more fully shown by the following examples which are provided for purposes of illustration, and are not to be construed as limiting the invention in any way.

EXAMPLES

Example 1: Confectionery Chip—Granulated Sugar and Glucose Syrup

Confectionery chip products were prepared from confectionery chip dough compositions A, B, C, D, E, F, and G containing ingredients as set out in Table 1. Various representative root and grain starches were selected to establish the feasibility of the various starch sources.

TABLE 1

Confectionery chip dough composition

| Dough Ingredient | A | B | C | D | E | F | G |
|---|---|---|---|---|---|---|---|
| Water | 32.976 | 30.836 | 20 | 32.976 | 32.876 | 32.876 | 35.426 |
| Glucose Syrup, 42DE | 49.0 | 49.0 | 52.84 | 49.0 | 49.0 | 49.0 | 49.0 |
| White Granulated Sugar | 7.0 | 7.0 | 9.0 | 7.0 | 7.0 | 7.0 | 7.0 |
| Corn Starch | 9.5 | 12.31 | 17.31 | — | 9.5 | 9.5 | 7.0 |
| Rice Starch | — | — | — | 9.5 | — | — | — |
| Gum Arabic | — | — | — | — | 3.0 | — | — |
| Tara Gum | — | — | — | — | — | 0.1 | — |
| Xanthan Gum | — | — | — | — | — | — | 0.05 |
| Fruit flavor | 0.084 | 0.084 | 0.07 | 0.084 | 0.084 | 0.084 | 0.084 |
| Glycerin | 0.1 | 0.1 | 0.1 | 0.1 | 0.1 | 0.1 | 0.1 |
| Colorant (e.g., Yellow FD&C No. 6 Granules, Red #40, 1-5% solution) | 1.34 | 0.67 | 0.68 | 1.34 | 1.34 | 1.34 | 1.34 |
| Total | 100 | 100 | 100 | 100 | 100 | 100 | 100 |

The confectionery chip dough composition was prepared by first mixing starch and water until gelatinized. Next was added granulated sugar and color with mixing until dissolved. Glucose syrup was then added to form a slurry. The slurry was heated to 80-85° C. with occasional stirring to a targeted Brix=60-62 C. The mixture was allowed to cool to a targeted Brix 40-42 C. Flavor was then incorporated and the flavored mixture was pressed through a sieve of mesh size 1.8 mm to result in a smooth mixture with no lumps. The smooth mixture was spread in circular molds on a baking tray lined with a silicon mat and then baked at 140° C. at 3 fan speed, 0% humidity for 30 minutes. The chips were allowed to cool about 15 minutes to harden. The cooled chips were then packaged.

The baked chips had a thickness of about 1.1 mm, a longest dimension of about 6 cm and a weight of about 1.3 grams. The moisture content of the final confectionery chip product was 1-2% as measured by Karl Fischer Method, USP 37 revision, <921>, Method 1a, The U.S. Pharmacopeial Convention Rockville, MD (2014).

Example 2: Confectionery Chip Product Sanded with Food Acid

The confectionery chips of Example 1 were coated with a very thin film of canola oil from a spray can and sanded on both sides with a mixture of a food acid and crystalline saccharide particles (about 12 wt % of product). The sanded confectionery chip product was packaged in an air tight container.

Example 3: Confectionery Chip—Granulated Sugar

A confectionery chip product was prepared from a confectionery chip dough composition containing ingredients as set out in Table 2.

TABLE 2

Confectionery chip dough composition

| Dough Ingredient | H | I |
|---|---|---|
| Granulated sugar | 50 | 50 |
| Water | 24 | 24 |
| Hydrocolloid (e.g. xanthan gum, konjac) | 1 | 1 |
| Corn Starch | 24 | — |
| Potato Starch | — | 24 |
| Flavor | 0.36 | 0.36 |
| Color | 0.64 | 0.64 |
| Total | 100 | 100 |

In a process to prepare the confectionery chip dough composition, the granulated sugar, water, hydrocolloid, flavor, and color were combined and mixed under high shear and a temperature of about 55-65° C. to form a mixture. The starch was slowly combined with this mixture and mixed to form the confectionery chip dough composition that can be allowed to stand for about 5 to about 45 minutes. The confectionery chip dough composition was sheeted to a thickness of about 1-1.5 mm and cut into chip-size pieces. The pieces were baked at about 160° C. for about 25-30 minutes and allowed to cool to harden (about 15 minutes). A small amount of vegetable oil was applied to the surface of the confectionery chips and then the chips were packaged.

The moisture content of the final confectionery chip product was 1-2% as measured by Karl Fischer Method.

Example 4: Confectionery Chip—Isomalt

A sugar-free confectionery chip product was prepared from a confectionery chip dough composition containing ingredients as set out in Table 3.

TABLE 3

Confectionery chip dough composition

| Dough Ingredient | Ingredient Amount (%) |
|---|---|
| Water | 81.976 |
| Isomalt | 7.0 |
| Corn Starch | 9.5 |
| Flavor | 0.084 |
| Glycerin | 0.1 |
| Color | 1.34 |
| Total | 100 |

Example 5: Confectionery Chip—Juice, Dried Fruit

Confectionery chip products are prepared from confectionery chip dough compositions J, K, and L containing ingredients as set out in Table 4. In dough composition K, the water ingredient is replaced with a fruit juice. In dough composition L, a dried fruit powder is used as a coating ingredient.

TABLE 4

Confectionery chip dough composition

| | Ingredient Amount (%) | | |
|---|---|---|---|
| Dough Ingredient | J | K | L |
| Water | 76.61 | — | 76.15 |
| Orange Juice | — | 77.40 | — |
| Granulated sugar | 12.24 | 12.38 | 12.16 |
| Corn Starch | 9.75 | 9.91 | 9.69 |
| Flavor | 0.4 | 0.31 | 1.01 |
| Sanding mix | 0.2 | — | 0.2 |
| Freeze dried Raspberry Powder | — | — | 0.1 |
| Glycerin | 0.1 | — | 0.1 |
| Color | 0.7 | — | 0.57 |
| Canola oil | 0.01 | — | 0.01 |
| Total | 100 | 100 | 100 |

Formulation J: Mix the water, sugar and starch. Cook mixture until it reaches 72° C. and starts to thicken; continue cooking until it reached 25-26 Bx. Let the mixture cool to <20° C. Add the glycerin, mix well; add the flavors and colors, mix well. Put the mixture through a sieve to remove any lumps. Deposit the dough as thin flat discs of 0.06 inch thickness and bake at 120° C. for 34 minutes, 0% humidity, 3 fan speed. Remove from oven and cool completely. Spray the chips with a thin spray of canola oil on both sides. Sprinkle the sanding mixture on both sides.

Formulation K: Mix the juice, sugar and starch. Cook mixture until it thickens. Deposit as thin flat discs and bake at 120° C. for 20 mins, 0% humidity, 1 fan speed. Remove from oven and cool.

Formulation L: Prepare chips according to the process for Formulation J. The Raspberry powder is sprinkled on both sides of the chips along with the sanding mixture.

Example 6: Texture Analysis

The texture of the confectionery chip product A of Example 1 was measured and compared to a number of commercially available potato chip and snack chip products. Sample breaking force was measured with a TA. ST. plus Texture analyzer, Stable Micro Systems (SMS), Scarsdale, New York, using a spherical probe (TA-8, ¼" (6.35 mm) diameter ball), and with 50 kg load cell. The samples were placed centrally over the circular support of a HDP/CFS (Crisp Fracture Support Rig and corresponding Heavy Duty Platform available from SMS, a schematic of which is provided in FIG. 1: (1) is the Texture Analyzer (partial view), (10) is the probe, (20) is the Crisp Fracture Support Rig, and (30) is the Platform). The test settings were: pre-test speed 5.0 mm/sec., test speed 1 mm/sec., post-test speed 10 mm/sec., trigger force 5 g, and with a probe travel distance of the 3 mm. The breaking force is the first puncture into the chip. Ten (10) samples of each product were individually tested and the average of the breaking force was calculated. The results are provided in Table 5.

TABLE 5

| Sample | max force (g) | SD |
|---|---|---|
| TOSTITOS | 469.217 | 177.2 |
| Brownie brittle | 1119.757 | 766.242 |
| LAY'S potato chips | 246.948 | 129.856 |
| Kettle Chips | 546.201 | 294.226 |
| PRINGLES | 224.417 | 93.129 |
| LAY'S POPPABLES (pillow potato chips) | 602.602 | 316.676 |
| Thin Ribbon Candy-Sevigny's | 2524.83* | 269.011 |
| Whisps | 412.805 | 289.041 |
| Confectionery chip Example 1 A | 436.971 | 169.397 |

*Average of 3 samples.

As the results show, approximately 436 g maximum force is required to break the confectionery chip product. This is consistent with the confectionery chip being able to provide a loud crunch at initial bite and crunch sounds during chewing. The confectionery chip product's maximum force is between the range of maximum force exhibited by thin, classic potato chips (LAY'S potato chips ~246 g) and Kettle potato chips (Kettle Chips ~546 g). It is also significantly lower than the amount of force needed for thin hard boiled candy (Thin Ribbon Candy—Sevigny's, ~2524 g), which produces a hard crunch and hard sharp pieces upon breaking as opposed to a more crispy crunch provided by the confectionery chip product.

Example 7: Dissolution Analysis

A dissolution study was conducted to examine the dissolution characteristics of the confectionery chip product compared to conventional potato chips and to ribbon candy. Samples were placed in beakers containing water (100 mL, 100 g) at room temperature and a spinner speed of 350 RPM (flavor plate spinner). At time points 0 and 3 minutes, the weight of the sample was measured. Before weighing, excess water was removed at each time point by blotting with a paper towel. The percent dissolved was calculated from the weight of the sample at time 0 and at time 3 minutes. The results are provided in Table 6.

TABLE 6

| Sample | Time 0 minutes Weight of sample (grams) | Time 3 minutes | % dissolved |
|---|---|---|---|
| Kettle Chips | 1.607 | 2.58 | −60.5476 |
| Confectionery chip Example 1 A | 1.887 | 1.668 | 11.60572 |
| HALLS Defense | 3.107 | 2.2 | 29.19215 |
| RICOLA Honey Herb | 4.01 | 2.8 | 30.17456 |
| Thin Ribbon Candy-Sevigny's | 3.394 | 1.059 | 68.79788 |

As the results show, the confectionery chip product exhibited much lower dissolution in water after three minutes compared to conventional hard candy in the shape of cough drops (HALLS and RICOLA) or in the shape of thin ribbon candy. Based on the thin format, having a high surface area, it was expected the confectionery chip product would have a high dissolution, as with ribbon candy, a hard candy that has a high surface area. Instead, it was surprisingly found that the confectionery chip product dissolved slowly, with a low dissolution. Not wishing to be bound by theory, but the slow dissolution is able to provide a consumer with a longer lasting taste experience with the confectionery chip product as the product will remain in the mouth longer than conventional hard candy.

The invention disclosed herein includes at least the following aspects:

Aspect 1: A confectionery chip product, comprising: a bulk sweetener; and a gelatinized starch; wherein the confectionery chip product comprises one or more of the following attributes: a moisture content of about 0 to less than 6 wt %, about 0.25 to about 5wt %, about 0.5 to about 4 wt %, about 0.75 to about 3 wt %, or about 1 to about 2 wt % based on the total weight of the confectionery chip product; a thickness of less than 4 mm; a non-uniform cell structure; and a breaking force of less than 2000 g, about 150 to about 1500 g, about 200 to about 1000 g, 300 to about 800 g, or about 400 to about 600 g as measured by a texture analyzer having a spherical probe (TA-8, ¼" (6.35 mm)diameter ball), and with 50 kg load cell.

Aspect 2: The confectionery chip product of Aspect 1, wherein the gelatinized starch is derived from a native starch, a pre-gelatinized starch, or a combination thereof.

Aspect 3: The confectionery chip product of Aspect 1 or 2, wherein the gelatinized starch is a plant root starch; a plant grain starch; or a combination thereof.

Aspect 4: The confectionery chip product of any one of Aspects 1-3, wherein the gelatinized starch is corn, wheat, oat, barley, bulgur, millet, rice, potato, tapioca, arrowroot, or a combination thereof.

Aspect 5: The confectionery chip product of any one of Aspects 1-4, wherein the bulk sweetener is a mono-saccharide, a di-saccharide, a poly-saccharide, a sugar alcohol, a sugar alcohol syrup, or a combination thereof; sucrose (sugar), dextrose/glucose, maltose, dextrin, xylose, ribose, mannose, galactose, fructose (levulose), lactose, invert sugar, fructo oligo saccharide syrups, partially hydrolyzed starch, corn syrup solids, such as high fructose corn syrup, glucose syrup, or a combination thereof; sucrose or sucrose and glucose syrup; or erythritol, galactitol, isomalt, a hydrogenated starch hydrolysate, lactitol, maltitol, maltitol syrup, mannitol, polyglycitol, sorbitol, sorbitol syrups, xylitol, or a combination thereof.

Aspect 6: The confectionery chip product of any one of Aspects 1-5, further comprising a non-starch hydrocolloid, a colorant, a dried fruit or vegetable, a fat or oil, a flavorant, a flavor modulator or potentiator, a food acid or a salt thereof, a functional ingredient, a high-intensity sweetener, a dough conditioner, a crystallization inhibitor, a nut or nut pieces, a salt, a sensate, a coating ingredient, or a combination thereof.

Aspect 7: The confectionery chip product of Aspect 6, wherein the non-starch hydrocolloid is a plant exudate, a seed gum, a seaweed extract, or a combination thereof; acacia gum/gum arabic, agar agar, an alginate, bacterial gums (e.g. gellan gum), beta glucan, a carrageenan, chitosan, curdlan, furcellaran, a galactomannan (e.g., Guar gum, Locust bean gum, tara gum), gelatin, gellan gum, glucomannan (e.g., Konjac), gum ghatti, karaya gum, konjacxyloglucan, locust bean gum, a modified cellulose (e.g., carboxymethlcellulose (CMC), ethylcellulose (MC), hydroxypropylcellulose (HPC), hydroxypropyl methylcellulose (HPMC), microcrystalline cellulose, methylcellulose), a modified natural gum (e.g., a propylene glycol alginate, carboxymethyl locust bean gum, low methoxyl pectin), pectin, tamarin, tragacanth gum, xanthan gum, or a combination thereof; or xanthan gum, konjac, or a combination thereof.

Aspect 8: The confectionery chip product of Aspect 6 or 7, further comprising glycerin.

Aspect 9: The confectionery chip product of any one of Aspects 1-8, comprising sucrose or sucrose and glucose syrup; a gelatinized corn starch; glycerin, a non-starch hydrocolloid, or a combination thereof; and a flavorant.

Aspect 10: The confectionery chip product of any one of Aspects 1-9, comprising a coating ingredient on at least a portion of a surface of the confectionery chip product, wherein the coating ingredient is a colorant, a dried fruit or vegetable, a fat or oil, a flavorant, a flavor modulator or potentiator, a food acid or a salt thereof, a functional ingredient, a high-intensity sweetener, a nut or nut pieces, a salt, a sensate, or a combination thereof.

Aspect 11: The confectionery chip product of any one of Aspects 1-10, wherein the confectionery chip product has a thickness of about 0.2 to about 3.0 mm, about 0.5 to about 2.75 mm, about 0.75 to about 2.5 mm, about 1.0 to about 2.25 mm, or 1.25 to about 2.0 mm.

Aspect 12: The confectionery chip product of any one of Aspects 1-11, wherein the confectionery chip product has a density of about 0.4 to about 1.5 g/cc, specifically about 0.5 to about 1.3 g/cc, more specifically about 0.6 to about 1.1 g/cc, yet more specifically about 0.7 to about 1.0 g/cc, and still yet more specifically about 0.8 to about 0.9 g/cc.

Aspect 13: The confectionery chip product of any one of Aspects 1-12, wherein the product has a non-uniform cell structure wherein the distribution of cell sizes, as determined by the longest dimension, has a ratio of at least 10:1 and comprises at least one cell whose length is at least half of the thickness of the confectionery chip product.

Aspect 14: The confectionery chip product of any one of Aspects 1-13, wherein the crystallinity of the bulk sweetener is less than 30%.

Aspect 15: The confectionery chip product of any one of Aspects 1-14, wherein the bulk sweetener and gelatinized starch is at least 90 wt % of the total weight of the confectionery chip product.

Aspect 16: The confectionery chip product of any one of Aspects 1-15, wherein the starch is pre-gelatinized starch.

Aspect 17: A method of making a confectionery chip product of any one of Aspects 1-16, comprising preparing a confectionery chip dough composition that is capable of being formed into a sheet; forming pieces from the sheet; and removing moisture from the pieces to form the confectionery chip product, e.g., by baking, microwaving, drying under vacuum, or a combination thereof.

Aspect 18: The method of Aspect 17, wherein the confectionery chip dough composition is prepared by mixing a bulk sweetener and water or juice to form a first mixture; mixing a hydrated starch with the first mixture to form a second mixture, wherein the second mixture is the confectionery chip dough composition or the second mixture is combined with an additional ingredient to form the confectionery chip dough composition.

Aspect 19: The method of Aspect 18, wherein the first mixture further comprises a non-starch hydrocolloid, a colorant, a dried fruit or vegetable, a fat or oil, a flavorant, a flavor modulator or potentiator, a food acid or a salt thereof, a functional ingredient, a high-intensity sweetener, a dough conditioner, a crystallization inhibitor, a nut or nut pieces, a salt, a sensate, or a combination thereof.

Aspect 20: The method of Aspect 18 or 19, wherein the first mixture is prepared under high shear.

Aspect 21: The method of any one of Aspects 17-20, wherein the confectionery chip dough composition is prepared at room temperature to about 90° C., about 25 to about 80° C., about 30 to about 70° C., about 35 to about 65° C., or about 40 to about 60° C.

Aspect 22: The method of any one of Aspects 17-21, wherein the pieces are baked at a temperature of about 130 to about 180° C., about 140 to about 170° C., or about 150 to about 160° C. for about 5 to about 45 minutes, about 15 to about 40 minutes, or about 25 to about 30 minutes.

Aspect 23: The method of any one of Aspects 17-22, wherein the confectionery chip dough composition, once prepared, is sheeted within a timeframe of about 5 to about 75 minutes, about 10 to about 60 minutes, about 20 to about 50 minutes, or about 30 to about 40 minutes from completion of the dough composition preparation.

Aspect 24: A packaged confectionery product, comprising a plurality of the confectionery chip products of any one of Aspects 1-16 or a plurality of the confectionery chip products prepared by the method of any one of Aspects 17-23.

Aspect 25: A method of making a confectionery having a non-uniform cell structure, the method comprising: mixing a bulk sweetener, water, and a gelatinized starch to form a mixture; heating the mixture to convert the water to vapor to form a confectionery comprising a non-uniform cell structure; wherein the confectionery comprises 50 wt % or more bulk sweetener, 5 wt % or more gelatinized starch, and less than 3 wt % fat, wherein each amount is based on the total weight of the confectionery.

Aspect 26: A confectionery chip product, comprising: about 45 to about 85 wt % of a bulk sweetener, the bulk sweetener having less than 30% crystallinity, about 5 to about 50 wt % of a gelatinized starch, the total weight of the bulk sweetener and gelatinized starch is at least 90 wt %, and a moisture content of about 0 to less than 6 wt %, about 0.25 to about 5wt %, about 0.5 to about 4 wt %, about 0.75 to about 3 wt %, or about 1 to about 2 wt %, wherein all weights are based on the total weight of the confectionery chip product.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The endpoints of all ranges directed to the same component or property are inclusive of the endpoints, are independently combinable, and include all intermediate points and ranges (e.g., ranges of "up to 25 wt %, or more specifically 5 to 20 wt %" is inclusive of the endpoints and all intermediate values of the ranges of "5 to 25 wt %," such as "10 to 23 wt %," "20 to 24," "1 to 5 wt %," etc.). Disclosure of a narrower range or more specific group in addition to a broader range is not a disclaimer of the broader range or larger group. The term "combination" is inclusive of a homogenous or non-homogenous blend, or mixture of the named components into an integrated whole. The term "homogenous" refers to a uniform blend of the components. The word "or" means "and/or." The terms "front", "back", "bottom", and/or "top" are used herein, unless otherwise noted, merely for convenience of description, and are not limited to any one position or spatial orientation. "Optional" or "optionally" means that the subsequently described event or circumstance may or may not occur, and that the description includes instances where the event occurs and instances where it does not. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A confectionery chip product, comprising:
   about 45 to about 85 wt % of a bulk sweetener, wherein the bulk sweetener is not a dried fruit or dried vegetable; and
   about 5 to about 50 wt % of a gelatinized starch, wherein each amount is based on the total weight of the confectionery chip product;
   wherein the confectionery chip product has
   a moisture content of about 0 to less than 6 wt % based on the total weight of the confectionery chip product; and
   a thickness of less than 4 mm;
   and further wherein the confectionery chip product optionally comprises one or more of the following attributes:
   a non-uniform cell structure; and
   a breaking force of less than 2000 g as measured by a texture analyzer having a spherical probe and with 50 kg load cell.

2. The confectionery chip product of claim 1, wherein the gelatinized starch is derived from
   a native starch, a pre-gelatinized starch, or a combination thereof.

3. The confectionery chip product of claim 1, wherein the gelatinized starch is
   a plant root starch;
   a plant grain starch; or
   a combination thereof.

4. The confectionery chip product of claim 1, wherein the gelatinized starch is corn, wheat, oat, barley, bulgur, millet, rice, potato, tapioca, arrowroot, or a combination thereof.

5. The confectionery chip product of claim 1, wherein the bulk sweetener is a mono-saccharide, a di-saccharide, a poly-saccharide, a sugar alcohol, a sugar alcohol syrup, or a combination thereof;

sucrose, dextrose, maltose, dextrin, xylose, ribose, mannose, galactose, fructose, lactose, invert sugar, fructo oligo saccharide syrups, partially hydrolyzed starch, corn syrup solids, such as high fructose corn syrup, glucose syrup, or a combination thereof;

sucrose or sucrose and glucose syrup; or erythritol, galactitol, isomalt, a hydrogenated starch hydrolysate, lactitol, maltitol, maltitol syrup, mannitol, polyglycitol, sorbitol, sorbitol syrups, xylitol, or a combination thereof.

6. The confectionery chip product of claim 1, further comprising a non-starch hydrocolloid, a colorant, a dried fruit or vegetable, a fat or oil, a flavorant, a flavor modulator or potentiator, a food acid or a salt thereof, a functional ingredient, a high-intensity sweetener, a dough conditioner, a crystallization inhibitor, a nut or nut pieces, a salt, a sensate, a coating ingredient, or a combination thereof.

7. The confectionery chip product of claim 6, wherein the non-starch hydrocolloid is a plant exudate, a seed gum, a seaweed extract, or a combination thereof;

acacia gum/gum arabic, agar agar, an alginate, a bacterial gum, beta glucan, a carrageenan, chitosan, curdlan, furcellaran, a galactomannan, gelatin, gellan gum, glucomannan, gum ghatti, karaya gum, konjacxyloglucan, locust bean gum, a modified cellulose, a modified natural gum, pectin, tamarin, tragacanth gum, xanthan gum, or a combination thereof; or xanthan gum, konjac, or a combination thereof.

8. The confectionery chip product of claim 6, further comprising glycerin.

9. The confectionery chip product of claim 1, comprising sucrose or sucrose and glucose syrup;

a gelatinized corn starch;

glycerin, a non-starch hydrocolloid, or a combination thereof; and a flavorant.

10. The confectionery chip product of claim 1, comprising a coating ingredient on at least a portion of a surface of the confectionery chip product, wherein the coating ingredient is a colorant, a dried fruit or vegetable, a fat or oil, a flavorant, a flavor modulator or potentiator, a food acid or a salt thereof, a functional ingredient, a high-intensity sweetener, a nut or nut pieces, a salt, a sensate, or a combination thereof.

11. The confectionery chip product of claim 1, wherein the confectionery chip product has a thickness of about 0.2 to about 3.0 mm.

12. The confectionery chip product of claim 1, wherein the confectionery chip product has a density of about 0.4 to about 1.5 g/cc.

13. The confectionery chip product of claim 1, wherein the product has a non-uniform cell structure wherein the distribution of cell sizes, as determined by the longest dimension, has a ratio of at least 10:1 and comprises at least one cell whose length is at least half of the thickness of the confectionery chip product.

14. The confectionery chip product of claim 1, wherein the bulk sweetener and gelatinized starch is at least 90 wt % of the total weight of the confectionery chip product.

15. The confectionery chip product of claim 1, wherein the starch is pre-gelatinized starch.

16. A method of making a confectionery chip product of claim 1, comprising preparing a confectionery chip dough composition that is capable of being formed into a sheet;

forming pieces from the sheet; and removing moisture from the pieces to form the confectionery chip product.

17. The method of claim 16, wherein the confectionery chip dough composition is prepared by mixing a bulk sweetener and water or juice to form a first mixture;

mixing a hydrated starch with the first mixture to form a second mixture, wherein the second mixture is the confectionery chip dough composition or the second mixture is combined with an additional ingredient to form the confectionery chip dough composition.

18. The method of claim 17, wherein the first mixture further comprises a non-starch hydrocolloid, a colorant, a dried fruit or vegetable, a fat or oil, a flavorant, a flavor modulator or potentiator, a food acid or a salt thereof, a functional ingredient, a high-intensity sweetener, a dough conditioner, a crystallization inhibitor, a nut or nut pieces, a salt, a sensate, or a combination thereof.

19. The method of claim 17, wherein the first mixture is prepared under high shear.

20. The method of claim 16, wherein the confectionery chip dough composition is prepared at room temperature to about 90° C.

21. The method of claim 16, wherein the pieces are baked at a temperature of about 130 to about 180° C. for about 5 to about 45 minutes.

22. The method of claim 16, wherein the confectionery chip dough composition, once prepared, is sheeted within a timeframe of about 5 to about 75 minutes from completion of the dough composition preparation.

23. A packaged confectionery product, comprising a plurality of the confectionery chip products of claim 1.

24. A method of making a confectionery having a non-uniform cell structure, the method comprising:

mixing a bulk sweetener, water, and a gelatinized starch to form a mixture;

heating the mixture to convert the water to vapor to form a confectionery comprising a non-uniform cell structure;

wherein the confectionery comprises 50 wt % or more bulk sweetener, wherein the bulk sweetener is not a dried fruit or dried vegetable, 5 wt % or more gelatinized starch, and less than 3 wt % fat, wherein each amount is based on the total weight of the confectionery.

25. A confectionery chip product, comprising:

about 45 to about 85 wt % of a bulk sweetener, wherein the bulk sweetener is not a dried fruit or dried vegetable, about 5 to about 50 wt % of a gelatinized starch, the total weight of the bulk sweetener and gelatinized starch is at least 90 wt %, and a moisture content of about 0 to less than 6 wt %, wherein all weights are based on the total weight of the confectionery chip product, and further wherein the confectionery chip product has a thickness of less than 4 mm.

* * * * *